L. F. Parker.
Harvester.
No 84507. Patented Dec. 1, 1868
Fig: 2.
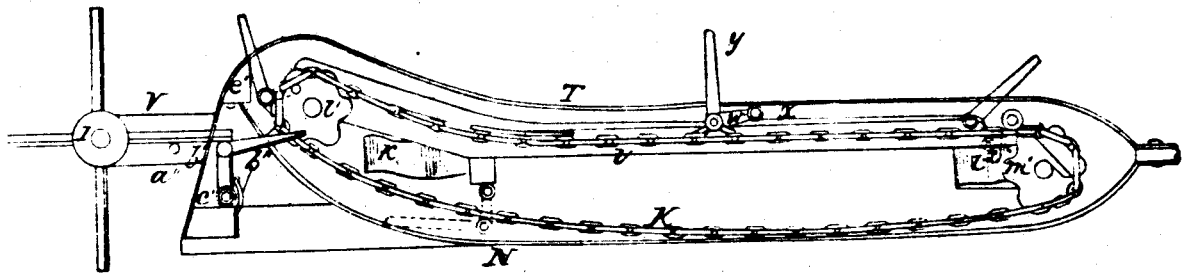
Fig 3.
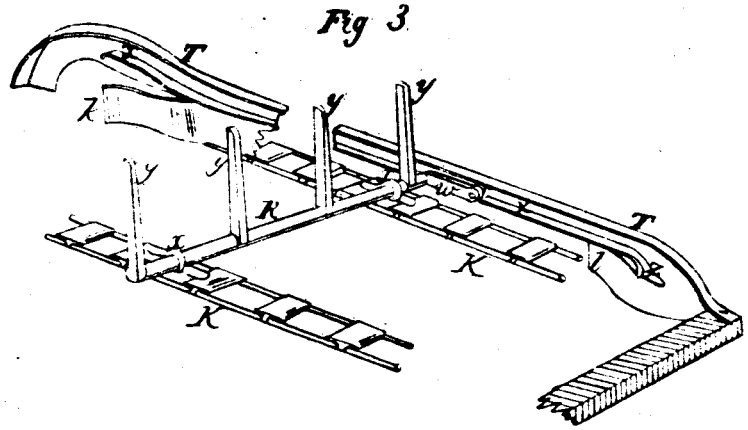

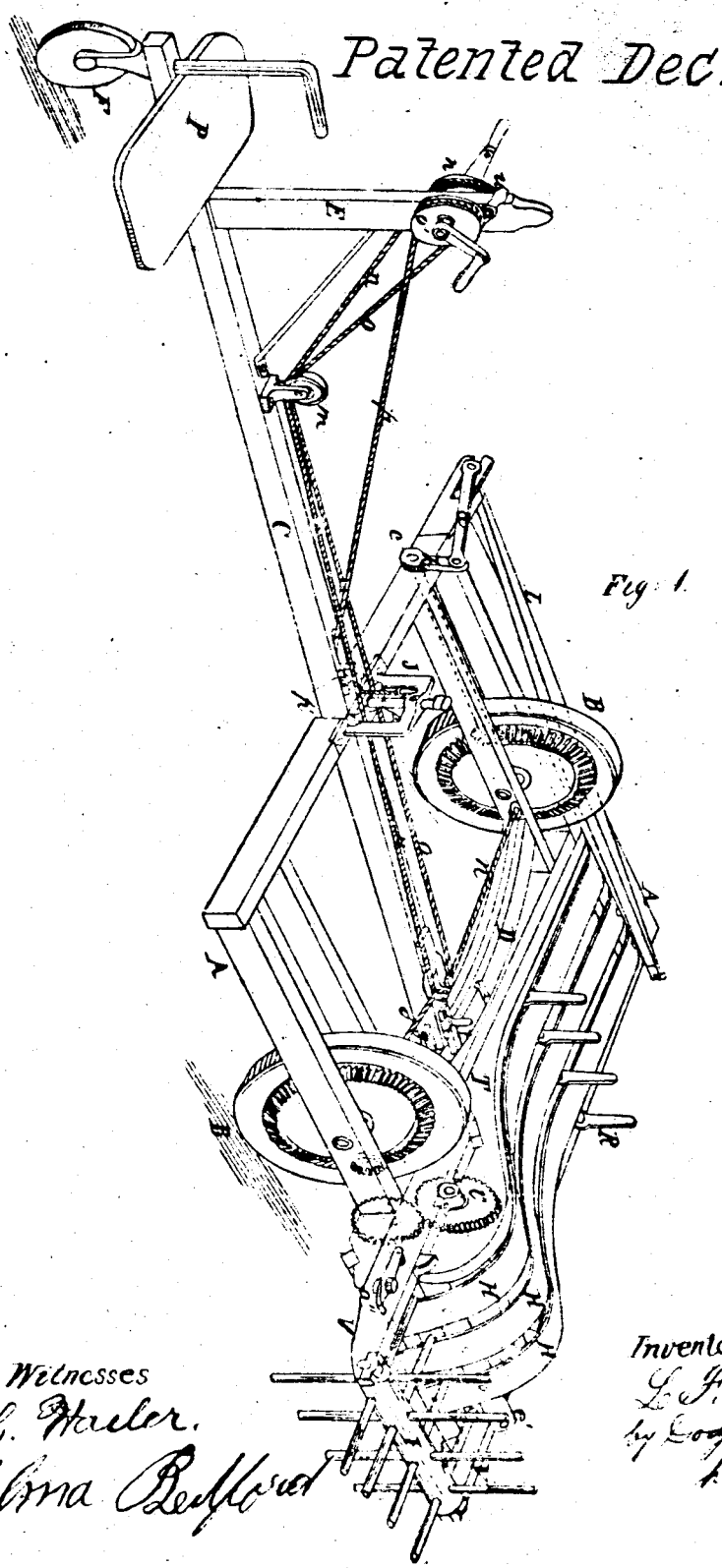

UNITED STATES PATENT OFFICE.

L. F. PARKER, OF DAVENPORT, IOWA.

IMPROVEMENT IN HARVESTERS.

Specification forming part of Letters Patent No. 84,507, dated December 1, 1868.

*To all whom it may concern:*

Be it known that I, L. F. PARKER, of Davenport, in the county of Scott and State of Iowa, have invented certain new and useful Improvements in Harvesters; and I do hereby declare that the following is a full, clear, and exact description thereof, reference being had to the accompanying drawings, making part of this specification, and to the letters of reference marked thereon, like letters indicating like part wherever they occur.

To enable others skilled in the art to construct and use my invention, I will proceed to describe it.

My invention consists in a novel method of constructing machines for cutting standing grain, as hereinafter more fully explained.

Figure 1 is a perspective view of the improved machine. Fig. 2 is a transverse sectional view taken on the line $x\ x$ of Fig. 1, and Fig. 3 is a perspective view of the rake and its guide.

In constructing my improved machine, I make a rectangular frame, A, of a width corresponding with the length of the sickle, and mount it about midway of its length on two independent wheels, B, as represented in Fig. 1, the sickle being located across the front end of the frame.

The machine is to be operated by being pushed forward against the standing grain, and for the purpose of thus operating it I attach to the frame A a tongue or push-pole, C, which extends backward far enough to permit a team to be attached to its rear end, and still be behind the machine.

On the rear end of the pole C, I locate a platform, P, for the driver and operator to stand upon, and attach a caster-wheel, F, for it to rest upon, as shown in Fig. 1. This pole C is not attached rigidly to the main frame, but is pivoted by means of a bolt, $f$, to a yoke, J, attached to the rear cross-bar of the frame A, so as to permit the pole C to move laterally to the right or left, independent of the main frame, its front end being connected to the frame by a friction-roller, $g$, working in a groove in the rear face of a curved cross-bar, D, extending across the frame in front of the driving-wheels B, there being a latch, $t$, pivoted to the pole at its front end, so as to engage in a notch at the center of bar D and lock the pole in place when it is desired to move the machine forward in a straight line, this latch having a cord connected to it and extending back to the post E, by which the driver can unlatch the pole when it is desired to turn the machine; or the pole may be hinged permanently.

For the purpose of enabling the driver to more readily turn the machine, I secure cords $o$ and $n$ to opposite sides of the main frame, and pass them in opposite directions around a pulley, $s$, secured upon the pole C at a point in line between the points where said cords are attached to the main frame, or nearly so, and from thence extend them backward along the top of the pole and pass them under another pulley, $m$, near the rear end, and thence up and around a windlass, $n'$, in opposite directions, this windlass being secured to the upright E in a convenient position for the operator, and being provided, also, with a crank for operating it, and a ratchet and pawl for holding it stationary when desired, these devices being shown in Fig. 1.

It will thus be seen that by releasing the windlass and winding up the cord on either side the main frame can be turned or guided to the right or left, according to which way the windlass is turned.

In order to adjust the height of the sickle so as to cut higher or lower, the bolt $f$, by which the pole is pivoted to the yoke J, is made to slide vertically in the yoke, and thus permit the rear end of the frame A to be raised or lowered in reference to the pole C, the frame A in such case tipping on the wheels B as a fulcrum, and thereby causing the front end of the main frame to rise or fall, according as the rear end is lowered or raised. To regulate these movements, a cord, $p$, has one end secured to the upper part of the yoke J, and passes thence down under a pulley, $p'$, secured on the pole C, as shown in Fig. 1, and extends from thence back to the post E, where it is secured to the windlass $o'$, by which it can be operated at pleasure, there being a pawl, $u$, to lock the windlass in position and hold it stationary when adjusted, as desired.

I operate the sickle by means of a lever, L, located outside of the left-hand driving-wheel, as represented in Fig. 1, this lever being pivoted upon the outside bar of the main frame, and connected at its front directly to the sickle, its rear end being connected by a pitman-rod, $a$, to a crank, $b$, secured to the rear end of a shaft, $c$, having a bevel-pinion at its front end, arranged to receive motion from bevel-gear on the inside of the left-hand driving-wheel B. By pivoting this lever L forward of its center, so as to make its rear arm longer than its front arm, I obtain a powerful leverage on the sickle, and thus give to it a powerful stroke, making it cut with certainty and ease.

The raking apparatus is mounted directly in rear of the sickle at the front end of the main frame, and consists of two endless chains, K, passing around sprocket-wheels secured on to shafts located at the opposite front corners of the main frame, these chains thus passing transversely across the front of the main frame, and carrying with them a rake, R, which consists of a rod, having a series of four or more arms projecting at right angles therefrom, as represented more clearly in Fig. 3. This rake is secured to the chains by means of eyes $r$ in such a manner as to permit it to turn, and also to slide laterally a short distance therein, and to its inner end is secured rigidly a crank, $w$, which projects at a right angle backward from the teeth $y$, this crank having an outwardly-projecting wrist to engage and move in a groove, $x$, formed in the front side of a bar or plate, T, which extends across the main frame, alongside of the inner chain, K, the object being to hold the rake-teeth upright, so as to gather and carry the cut grain forward with it and deposit it at the right-hand side of the machine.

A series of bars, U, Fig. 2, extends across the front of the main frame in proper position to support the rake R as it moves forward; and above these, and over the rake and chain, is stretched a series of metal bars, H, as shown in Fig. 1, these bars being separated, so as to leave spaces between them for the teeth $y$ of the rake to move in; and underneath the chains are placed two longitudinal bars or plates, N, on which the outer teeth of the rake rest when turned down into a horizontal position, and moving backward, as shown in red in Fig. 2.

The operation of the rake is as follows: As motion is imparted to the chains K the rake is moved forward, sweeping the grain which falls on the bars H as it is cut forward with it until it arrives at the right-hand side of the frame, in the position shown in red, when the grain slides off the bars H onto the arms of the reel I. At this point the rake-teeth strike against a cross-bar, $c'$, and as the crank or guide $w$ has by this time reached the end of the groove $x$, and is freed therefrom, it permits the rake to tip and pass down underneath, where they lie in a horizontal position, and rest on the bars N as they are moved back by the chains K. As the rake arrives at the opposite side, and is carried up over the shaft of wheels $m'$, the inner end or guide of the rake-shaft strikes against the plate or guide $l$, (shown in Fig. 3,) which moves the rake endwise far enough to bring the crank $w$ on the inner side of the plate T, so as to enter the groove $x$, the wrist striking against the stop $z$, thereby causing the rake to assume an upright position, as illustrated in red at the right-hand end of Fig. 2, there being a guide-plate, K, at the opposite end, curved in the opposite direction, behind which the crank or arm $w$ enters as the rake passes down at that end, thereby shoving the rake over to that side, so that while moving back the arm $w$ passes outside of the plate T.

Upon a frame, V, which projects from the front right-hand corner of the machine, in line with the raking apparatus, is mounted a roll, I, having a series of radially-projecting arms, so arranged as to have their ends enter the spaces between the bars H, where they strike and rest upon a rock-shaft, $b'$, pivoted at the lower end of downwardly-projecting arms, as shown at $c'$, and having a horizontally-projecting arm, $b''$, against which the shaft of the rake strikes as it passes down over the wheel $l'$, thus drawing the rock-shaft $b'$ back from under the end of the arms of the reel I, and permitting the grain which has been deposited thereon by the rake to fall to the ground, there being a spring so arranged as to throw the shaft $b'$ forward as soon as the rake passes the arm $b''$, and thus support the arms in position to receive the next bundle.

In case the grain should be too light to form a bundle of sufficient size at a single passage of the rake, the reel is retained in position by means of a spring-catch, $a''$, pivoted to the side of the frame V, as shown in Fig. 1, and having an arm protruding through far enough to engage under the outer arm of the reel, there being a cord attached to this catch and extending back to the driver's stand, so that he can operate it at pleasure.

Motion is transmitted to the rake from gearing on the outside of the right-hand driving-wheel through the medium of a bevel-pinion and shaft, connecting with a wheel, $l''$, on the outer end of the shaft carrying the sprocket-wheels $l'$, as represented in Fig. 1; but it is obvious that other gearing may be substituted for this, if preferred.

As represented in the drawings, the machine is intended to cut from the standing grain at its front and left-hand side; but it is obvious that it may be made to cut from the opposite side by simply reversing the rake, so as to deliver on the opposite side.

Having thus fully described my invention, what I claim is—

1. The pole C, pivoted at the rear end of the main frame, and having its front end arranged to move laterally in a guide-bar, D, located in front of the wheels, in combination with the cords $n$ $o$, pulley $s$, and windlass $n$, substantially as described.

2. The yoke J, attached to the main frame

A, and having the pole C, provided with the sliding bolt $f$, working therein, and operated by the cord $p$, arranged substantially as set forth.

3. The rake R, carried by the chains K, and having the arm $w$ working in the groove $x$ and against the guides $k$ and $l$, when said parts are arranged as shown and described.

4. The combination of the grain-receiving reel I, the rock-shaft $b'$, with its arm $b''$, to be operated by the rake R and the locking-bar $a''$, all constructed and arranged to operate as herein described.

5. So arranging the rake R as to impart to it a lateral movement from the sickle as it passes from the upper side of the platform and a return movement toward the sickle as it rises to the top of the platform, substantially as described.

L. F. PARKER.

Witnesses:
W. C. DODGE,
H. B. MUNN.